United States Patent [19]

Mayr et al.

[11] Patent Number: 4,993,804
[45] Date of Patent: Feb. 19, 1991

[54] OPTICAL CABLE AND METHOD FOR MANUFACTURING THEREOF

[75] Inventors: Ernst Mayr, Starnberg; Ulrich Oestreich, Munich, both of Fed. Rep. of Germany

[73] Assignee: Siemens Aktiengesellschaft, Berlin and Munich, Fed. Rep. of Germany

[21] Appl. No.: 434,311

[22] Filed: Nov. 13, 1989

[30] Foreign Application Priority Data

Nov. 22, 1988 [DE] Fed. Rep. of Germany ....... 3839415

[51] Int. Cl.$^5$ .............................................. G02B 6/44
[52] U.S. Cl. .................................................. 350/96.23
[58] Field of Search ........................... 350/96.10, 96.23

[56] References Cited

U.S. PATENT DOCUMENTS

| 4,333,706 | 6/1982 | Davis et al. | 350/96.23 |
| 4,370,023 | 1/1983 | Lange et al. | 350/96.23 |
| 4,703,997 | 11/1987 | Ijiri et al. | 350/96.23 |
| 4,840,454 | 6/1989 | Mayr | 350/96.23 |

Primary Examiner—Akm Ullah
Attorney, Agent, or Firm—Hill, Van Santen, Steadman & Simpson

[57] ABSTRACT

An optical cable comprises at least one bundle composed of a plurality of light waveguides which are preferably wrapped as a layer on a cable core. A non-hardenable filling compound is provided on the inside region of the light waveguide bundle between the layer of waveguides and core and the outer surfaces of the layer of optical waveguides is coated with a hardenable compound.

20 Claims, 1 Drawing Sheet

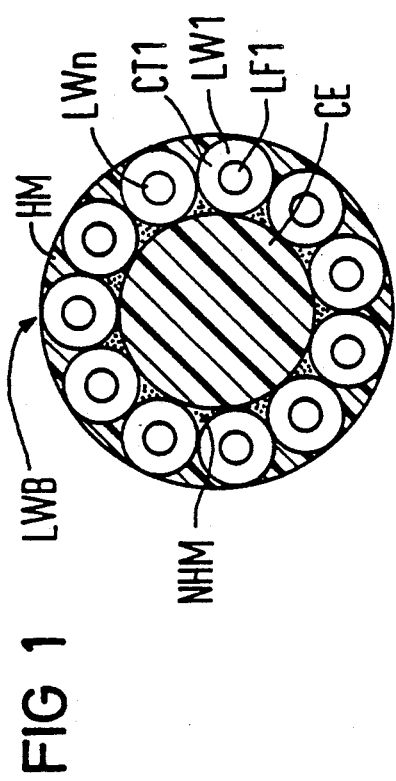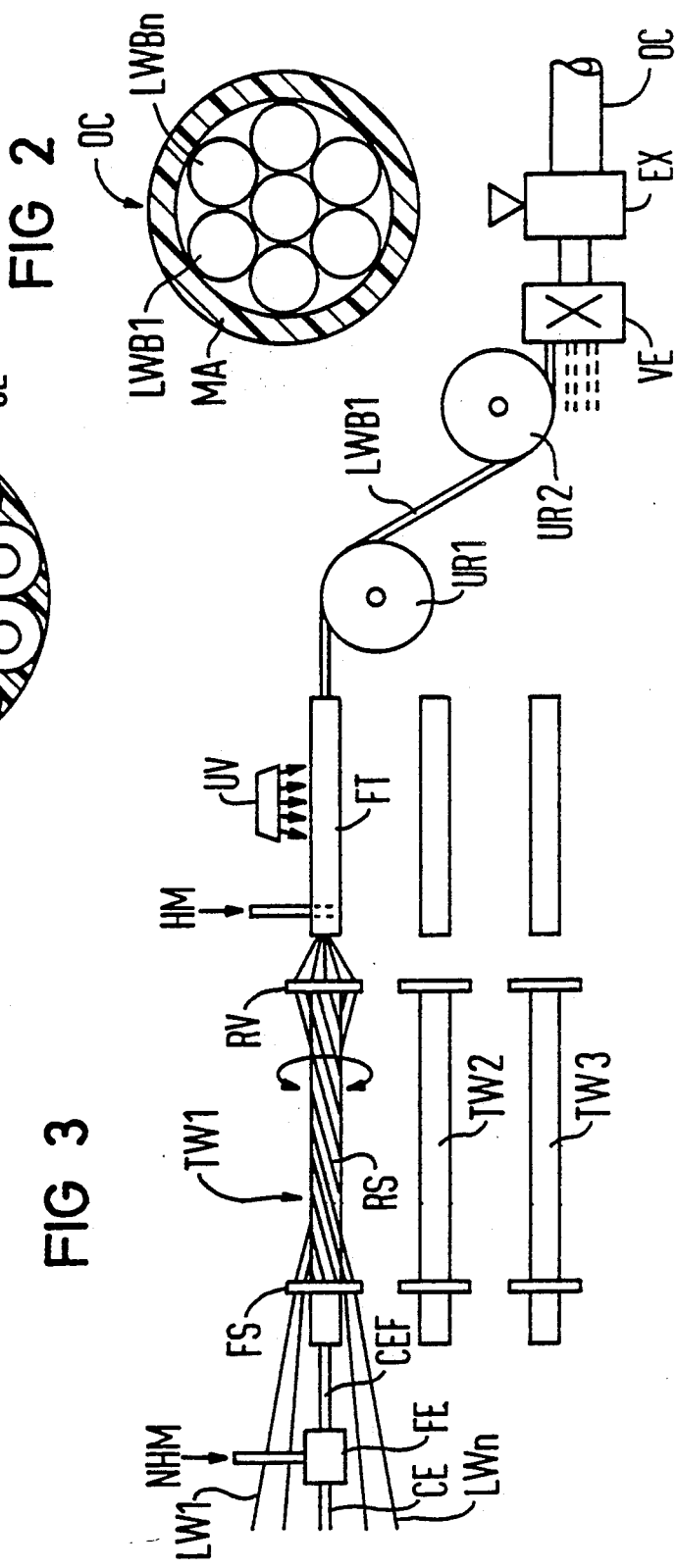

OPTICAL CABLE AND METHOD FOR MANUFACTURING THEREOF

BACKGROUND OF THE INVENTION

The present invention is directed to an optical cable which has a cable core composed of at least one bundle of a plurality of light waveguides, which bundle is held together by a curable compound.

U.S. Pat. No. 4,840,454, whose disclosure is incorporated by reference and which claims priority from German Application No. 36 29 827, discloses an optical cable of this type. The light waveguide bundle is completely saturated with a resin that is subsequently caused to harden by ultraviolet irradiation. All the gores or gaps between the light waveguides of the bundle are, thus, filled out with the resin and the possibility of a mutual dislocation or change in the position of the light waveguides or the influencing of their bending behavior depends on the nature and quality of the resin and on whether the resin has been cured to a greater or lesser extent. The resin, that cures optimally strong, is desirable for a good cohesion between the light waveguides inside the bundle, whereas an optimally soft resin is expedient for mobility and for the possibility of compensating for events, such as bending and twisting of the bundle.

SUMMARY OF THE INVENTION

The object of the invention is to create a structure for a light waveguide bundle, wherein the problem of cohesion and, simultaneously, the problem of the displaceability and the mobility of the light waveguides of the bundle are reliably solved in an optimally all-encompassing fashion. In an optical cable of the above-mentioned type, the improvement of the invention is achieved in that the filling compound that does not harden is provided on the inside region of the light waveguide bundle and that a curing compound is applied only on the outer region of the light waveguide bundle.

Due to the interaction of the hardening compounds in the outside region and the non-hardening filling compounds in the inside region, both the cohesion of the light waveguide bundle, as well as the possibility of adequate motion events inside the light waveguide bundle are established in an optimum fashion. A good cohesion within the light waveguide bundle is particularly of great significance when the light waveguides are not stranded at all or are stranded with alternating lay directions to form an SZ-stranding. A particular advantage may also be seen wherein the hardening of the thin, outer layer occurs relatively quickly, whereas the curing process requires a longer time, given a complete saturation of the entire light waveguide bundle with, for example, a hardening resin, as disclosed in the above-mentioned U.S. Patent. With ultraviolet-reactive compounds, moreover, it is particularly difficult to allow the radiation to proceed so far into the inside of the bundle that the inner regions are also hardened to an adequate extent. In order to assure this, either slow passes of the light waveguide bundle are required in the production of the bundle of the above-mentioned U.S. Patent or, on the other hand, the illumination paths for the ultraviolet light had to be extended over a great distance.

The invention is also directed to a method for manufacturing a cable of the above-mentioned bundles, with the improvement being that the individual light waveguides of the light waveguide bundle are supplied with a non-hardening filling compound and that, subsequently, a layer of hardening compound is then applied on the outside of the bundle. After this, the hardening compound is then cured.

Other advantages and features of the invention will be readily apparent from the following description of the preferred embodiments, the drawings and claims.

BRIEF DESCRIPTION OF THE DRAWINGS

FIG. 1 is an enlarged cross sectional view of a structure of a light waveguide bundle in accordance with the present invention;

FIG. 2 is a cross sectional view of an optical cable constructed of a plurality of light waveguide bundles of the present invention; and FIG. 3 is a schematic illustration of an apparatus for manufacturing a light waveguide bundle constructed in accordance with the present invention.

DESCRIPTION OF THE PREFERRED EMBODIMENTS

The principles of the present invention are particularly useful when incorporated in a light waveguide bundle LWB which is composed of a central element CE which is surrounded by a plurality of light waveguides LW1–LWn.

The central element (see FIG. 1) is composed, for example, of a plastic element tensile and forms the core of the light waveguide bundle LWB. Instead of such a tensile element, an additional light waveguide or an additional light waveguide bundle can be arranged in the core of the light waveguide bundle. A layer of light waveguides LW1–LW2 is applied onto the central element CE and is, preferably, stranded with an alternating direction of lay to form and SZ-stranding. As indicated in the case of light waveguides LW1, each of these light waveguides is composed of an optical fiber LF1 and of a protective coating CTI which may be either a single layer or multi-layer coating. The central element CE is coated with a non-hardening filler compound NHM and the light waveguides LW1–LWn are then pressed during the stranding process onto this filler layer. This non-hardening filler compound NHM is preferably composed of a thixotropic material, which may be a mixture composed of oil, thixotropic agents and, as warranted, organic thickeners. This filler compound can be fashioned relatively thin-bodied, for example, be a substance that easily drips at operating temperature range and will allow a good mobility of the light waveguides relative to one another during the manufacturing process, as well as in operation, such as when the bundle is being laid. This non-hardening filler compound NHM should fully retain its low viscosity during the manufacturing, as well as during later operations. Expediently, the viscosity value for the filler compound NHM lies in a range of between 5,000 and 30,000 m.Pas.

A hardening compound HM is applied on the outside region of the light waveguide bundle LWB. This hardening compound HM, as shown in the present example, will fill the outer gaps or gores between the individual light waveguides LW1–LWn, whereas the inner gores were closed or filled by the non-hardening filler compound NHM. Ultraviolet-reactive resins or ultraviolet-hardening lacquers preferably come into consideration as the material for the hardening compound HM. The viscosity of this hardening compound HM should be selected so high that the cohesion of the light waveguide bundle is also guaranteed when the stranding onto the central element CE occurs with an alternating lay direction or when no stranding whatsoever is carried out. Expedient values for the shore hardness of the hardened compound HM lie in the range of shore A50 through D70.

It is adequate in the limiting case when the hardening compound HM guarantees the cohesion of the light waveguide bundle LWB as a more or less surrounding, outer coating and, respectively, an outer skin. It is, thus, not absolutely necessary that the entire outer gores in the outer region be closed with this hardening compound HM.

An optical cable OC is illustrated in FIG. 2 and contains a plurality of light waveguide bundles LWB1-LWBn. An outside cladding or sheath MA, which may either be a single layer or multiply is arranged around these optical bundles LWB1-LWBn, which bundles can again be stranded with one another if desired. When a cable structure that is longitudinally watertight is desired, the remaining free space inside of the cladding MA can be filled with an additional soft filler compound.

A process for stranding the various light waveguides into the bundles and then forming the bundles into a cable is schematically illustrated in FIG. 3. As illustrated, a plurality of stranding devices TW1-TW3 are arranged in parallel with each of the stranding devices forming one of the light waveguide bundles shown in FIG. 1.

A central element CE is fed from the left and is coated with a non-hardening filler compound NHM which is applied on the outside surface of the element CE with a filler means FE. The central element obtained in this fashion and provided with the filler compound is referenced CEF and this runs into and through a bore of a pipe store RS. The pipe store RS comprises a guide disk FS via which the light waveguides LW1-LWn are supplied. The pipe element of the pipe store RS rotates together with a stranding disk RV in alternating directions and thereby produces stranding of the light waveguides LW1-LWn in an SZ form of stranding onto the coated central core CEF as it leaves the pipe store RS.

The hardening compound HM is then applied immediately after the stranding point of the pipe store RS and, preferably, in a guide tube FT in the present example. When the hardening material HM is an ultraviolet hardenable resin, the guide tube FT is expediently composed of silica glass in order to allow the ultraviolet radiation of the light source UV arranged thereabove to pass through the guide tube. The guide tube FT must be constructed of such a length as to obtain adequate hardening of the outer hardening compound HM so that a dripping off or the like of the non-hardenable filler compound NHM is avoided.

The light waveguide bundle LWB1 is obtained in this fashion and is supplied by deflection rollers UR1 and UR2 to a common stranding means VE and is subsequently supplied to pass through an extruder EX that applies the outer cladding MA so that the optical cable OC is produced. Of course, the bundle supply from the other stranding element means TW2, TW3, etc., are conducted to the common stranding means VE in a similar fashion, which is not illustrated.

A light waveguide bundle LWB constructed in accordance with the present invention, has the advantage that the light waveguides are held in an ordered, exact position that, for example, is identified by color coding, but are also held in an invariable fashion and yet still easily mobile. A bursting due to, for example, a lack of stranding or given an SZ-stranding, is prevented by the hardened outside skin HM. The manufacturing process itself is simple, because only hardening of the outer layer of hardenable material HM is required and the mobility inside the light waveguide bundle is significantly improved compared to the one completely filled with hardenable material. The overall structure of the light waveguide bundle remains longitudinally watertight. Short lengths of lay, such as 30-50 mm, having 4-8 lays can be employed for the SZ-stranding in the region of the pipe store stranding means TW1-TW3 so that the finished light waveguide bundle is also adequately flexible, namely without undesirable crushing of the fibers.

In order to guarantee an easy replacement or, respectively, cleaning of the light waveguide tube FT composed of the silica glass, it is expedient to construct this as being longitudinally divided into two parts, in other words into two half-shells. Tubes having a length of only a few centimeters are thereby adequate, because the hardening of the thin outer layer composed of the hardenable compound HM requires only a relatively slight irradiation. The feed of the hardening compound HM occurs a few millimeters after the stranding point, and the hardening compound HM that is initially still soft in this region is kept in shape by the guide tube FT.

The stranding of the individual light waveguide bundles at VE likewise expediently occurs with alternating directions of lay, in other words an SZ process having 1 through 3 lays and having a length of lay of 200-300 mm. The application of a filler compound into the interior of the sheath MA also expediently ensures a longitudinal watertightness of the cable OC.

A light waveguide bundle comprising, for example, 10 light waveguides will have an approximate diameter of 1.1 mm and, given the employment of the appropriate central element and of the hardening material HM that is still adequately soft, is highly flexible, given an adequate short length of lay.

A silicone acrylate is expediently used as the ultraviolet resin and will remain relatively soft in its cured condition. It is, thus, possible to easily part and to easily splice, the individual ordered light waveguides that are identified by color and, because the resin is transparent, to also identify them. The bendability of the light waveguide bundle LWB is symmetrical and no noteworthy torsion of the light waveguides is contained in the entire manufacturing process. When the central element CE is formed of an aramid yarn, the individual light waveguide bundle will still have relatively good tensile strength. An optical cable OC comprising, for example, 50 light waveguides that is fabricated in one work cycle has an outside diameter of approximately 10 mm.

Although various minor modifications may be suggested by those versed in the art, it should be understood that we wish to embody within the scope of the patent granted hereon all such modifications as reasonably and properly come within the scope of our contribution to the art.

We claim:

1. An optical cable having at least one bundle of a plurality of optical waveguides being arranged in a core of said cable, said plurality of optical waveguides forming outer gores and inner gores, a non-hardening filler compound being disposed in the inner gores and a hardenable compound being applied only in the outer gores of the bundle.

2. An optical cable according to claim 1, wherein the hardenable compound forms an outside skin holding the optical waveguides of the bundle together.

3. An optical cable according to claim 1, wherein at least the inner gores of the optical waveguides bundles are completely filled by the non-hardening filler compound.

4. An optical cable according to claim 1, wherein the hardenable compound is composed of a resin.

5. An optical cable according to claim 4, wherein the non-hardening filler compound is composed of a thixotropic material.

6. An optical cable according to claim 1, wherein the optical waveguides of the bundle are stranded with one another.

7. An optical cable according to claim 6, wherein the bundle has a central tensile element and said optical waveguides are standard onto said central element.

8. An optical cable according to claim 7, wherein the waveguides are stranded with an alternating directions of lay.

9. An optical cable according to claim 6, wherein the waveguides are stranded with an alternating lay direction.

10. An optical cable according to claim 1, wherein the hardenable compound at least partially fills outwardly extending gores of the bundle.

11. An optical cable according to claim 1, wherein the bundle includes a central element with the non-hardening filler compound disposed between the central element and a layer of the waveguides and the hardenable compound being disposed on an outer surface of the layer of waveguides.

12. An optical cable according to claim 11, wherein the hardenable compound is composed of an ultraviolet reactive resin.

13. An optical cable according to claim 12, wherein the non-hardening filler compound is composed of a thixotropic material.

14. An optical cable according to claim 1, wherein the non-hardening filler compound is composed of a thixotropic material.

15. An optical cable according to claim 1, wherein the hardenable compound is composed of an ultraviolet reactive resin.

16. A method for manufacturing a cable having at least one bundle with a layer of optical waveguides disposed around a core region, said layer forming outer gores and inner gores between adjacent waveguides, said method including the steps of applying a non-hardening filler compound to the inner gores of the layer of optical waveguides and subsequently applying a hardenable compound on the outside of said layer of waveguides to fill the outer gores.

17. A method according to claim 16, which includes providing a central element in the core region of the bundle, applying a non-hardening filler compound to the central element, subsequently stranding the layer of optical waveguides onto the central element and then coating the layer of stranded waveguides.

18. A method according to claim 17, wherein the step of stranding the waveguides onto the central element having the non-hardening filler compound comprises conducting the central element with the non-hardening filler compound through an interior of a pipe store stranding means which strands the optical waveguides onto the coated central element, and the step of applying the hardening compound applies the hardening compound at the output of the pipe store stranding means.

19. A method according to claim 17, wherein the step of applying the hardenable compound includes confining the hardenable compound on the stranded layer of waveguides and radiating the layer to cure the hardenable compound.

20. A method according to claim 19, wherein the hardenable resin is reactive to ultraviolet radiation and said step of applying a radiation applies ultraviolet radiation to cure the hardenable resin.

* * * * *